(12) United States Patent
Maruyama

(10) Patent No.: US 11,320,622 B2
(45) Date of Patent: May 3, 2022

(54) LENS BARREL, IMAGING APPARATUS, AND MANUFACTURING METHOD FOR LENS BARREL

(71) Applicant: CANON KABUSHIKI KAISHA, Tokyo (JP)

(72) Inventor: Toshifumi Maruyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 564 days.

(21) Appl. No.: 15/949,530

(22) Filed: Apr. 10, 2018

(65) Prior Publication Data

US 2018/0299636 A1     Oct. 18, 2018

(30) Foreign Application Priority Data

Apr. 14, 2017   (JP) .............................. JP2017-080958

(51) Int. Cl.
```
G02B  7/02    (2021.01)
G02B  1/18    (2015.01)
G02B  1/04    (2006.01)
G02B  3/04    (2006.01)
```
(52) U.S. Cl.
CPC ............. *G02B 7/025* (2013.01); *G02B 1/041* (2013.01); *G02B 1/18* (2015.01); *G02B 3/04* (2013.01); *G02B 7/028* (2013.01)

(58) Field of Classification Search
CPC .......... G02B 1/041; G02B 1/18; G02B 7/025; G02B 7/028; G02B 3/04; H04N 5/2254
USPC ....................................................... 359/507
See application file for complete search history.

(56) References Cited

U.S. PATENT DOCUMENTS

| | | | | |
|---|---|---|---|---|
| 3,489,491 A | * | 1/1970 | Creighton | G02C 7/04 351/159.33 |
| 3,619,044 A | * | 11/1971 | Kamath | G02B 1/043 351/110 |
| 4,093,361 A | * | 6/1978 | Erickson | B29D 11/00048 351/159.33 |
| 10,379,323 B2 | * | 8/2019 | Moriya | B29D 11/00375 |
| 10,871,624 B2 | * | 12/2020 | Nagao | G02B 7/025 |
| 2005/0195503 A1 | * | 9/2005 | Chen | G02B 27/0006 359/819 |
| 2006/0114579 A1 | | 6/2006 | Shibuya et al. | |
| 2008/0112050 A1 | * | 5/2008 | Nomura | G02B 1/105 359/507 |

(Continued)

FOREIGN PATENT DOCUMENTS

| | | |
|---|---|---|
| JP | 2004061629 A | 2/2004 |
| JP | 2006178388 A | 7/2006 |

(Continued)

OTHER PUBLICATIONS

Office Action issued in Japanese Appln. No. 2018-073460 dated Mar. 1, 2022. English translation provided.

*Primary Examiner* — Ricky D Shafer
(74) *Attorney, Agent, or Firm* — Rossi, Kimms & McDowell LLP

(57) ABSTRACT

A lens barrel includes a lens containing resin, and a lens holder configured to hold the lens via an adhesive. The lens includes a first area, and a second area, the adhesive being applied to the second area, and the second area being adhered to the lens holder and containing more oxides or modified materials of the resin than the first area.

14 Claims, 9 Drawing Sheets

(56) References Cited

U.S. PATENT DOCUMENTS

2011/0205643 A1* 8/2011 Schreiber ............ C23C 14/0694
359/819
2017/0322411 A1* 11/2017 Igarashi ............. G02B 23/2484

FOREIGN PATENT DOCUMENTS

| JP | 2009288683 A | 12/2009 |
| JP | 2010147383 A | 7/2010 |
| JP | 2011164284 A | 8/2011 |
| JP | 2015001666 A | 1/2015 |
| JP | 2015031930 A | 2/2015 |
| JP | 2015200787 A | 11/2015 |
| WO | 2008126549 A1 | 10/2008 |
| WO | 2014010571 A1 | 1/2014 |

* cited by examiner $O_2 + h\nu \rightarrow 2O\ (\lambda < 242\ nm)$    CHEMICAL FORMULA (1)
$O + O_2 \rightarrow O_3$    CHEMICAL FORMULA (2)
$O_3 + h\nu \rightarrow O_2^* + O\ (242 < \lambda < 290\ nm)$    CHEMICAL FORMULA (3)

|  | PULLING POWER AFTER THERMAL IMPACT |
|---|---|
| HYDROPHILIZED | 5 kg |
| UNHYDROPHILIZED | 0.1 kg |

FIG. 10

|  | PULLING POWER AFTER THERMAL IMPACT |
|---|---|
| HYDROPHILIZED | 3.5 kg |
| UNHYDROPHILIZED | 0.1 kg |

FIG. 11

| WAVELENGTH (nm) | PRE-TREATMENT TRANSMITTANCE (%) | PARTIALLY HYDROPHILIZED TRANSMITTANCE (%) | ENTIRELY HYDROPHILIZED TRANSMITTANCE (%) |
|---|---|---|---|
|  | L22a | L22 | L22b |
| 350 | 80 | 80 | 75 |
| 400 | 99 | 99 | 93 |
| 450 | 99 | 99 | 98 |
| 500 | 99 | 99 | 98 |
| 550 | 99 | 99 | 97 |
| 600 | 99 | 99 | 97 |
| 650 | 99 | 99 | 98 |
| 700 | 99 | 99 | 98 |
| 750 | 96 | 96 | 97 |
| 800 | 94 | 94 | 95 |

FIG. 12

| | ENTIRELY HYDROPHILIZED PRODUCT (L22b) | PARTIALLY HYDROPHILIZED PRODUCT (L22) |
|---|---|---|
| RATIO OF WATER ABSORBING AMOUNT | 1 | 0.02 |

LENS BARREL, IMAGING APPARATUS, AND MANUFACTURING METHOD FOR LENS BARREL

BACKGROUND OF THE INVENTION

Field of the Invention

The present invention relates to a lens barrel, an imaging apparatus, and a manufacturing method for a lens barrel.

Description of the Related Art

A conventional optical apparatus, such as a video camera and a single-lens reflex interchangeable lens, uses an inorganic material, such as glass ($SiO_2$) and fluorite ($MgF_2$) for an optical member (lens) for magnification-varying, focusing, etc. This lens is fixed on a thermoplastic lens holder by a thermal caulking method or a method using a solid supplemental material that exhibits a plastic or adhesive property with the infrared light or heat. Another well-known lens fixing method uses a liquid adhesive (UV curable adhesive) that generates a holding power and is cured by the UV light etc. In particular, after the lens position is fine-adjusted relative to the lens holder, the fixing method with the liquid adhesive is suitable.

An optical element mainly made of thermoplastic resin as an organic material or a so-called plastic lens is also used so as to reduce the weight and the cost of the optical apparatus. An attempt to fix this plastic lens onto the lens holder through thermal caulking causes a thermal distortion. Therefore, fixing the plastic lens with the thermal caulking is unsuitable because the optical performance cannot be maintained. Similarly, the thermal distortion occurs in an attempt to fix this plastic lens with the solid supplemental material that exhibits the thermoplastic or adhesive property with the infrared light or heat.

On the other hand, the UV curable adhesive has difficulties in providing a strong adhering power to the plastic lens. Japanese Patent Laid-Open No. ("JP") 2015-001666 discloses a method for improving the adhering power by modifying a material for a plastic lens.

However, when the material for the plastic lens is modified as disclosed in JP 2015-001666, the reliability of the plastic lens may lower. More specifically, JP 2015-001666 discloses selective use of a thermoplastic resin composition compatible with the adhesive or having a polar group with a good adhesive property. When the material with this polar is used, the refractive index varies due to moisture absorptions and the reliability may lower.

SUMMARY OF THE INVENTION

The present invention provides a lens barrel, an imaging apparatus, and a manufacturing method for the lens barrel, each of which improves an optical reliability of a plastic lens.

A lens barrel according to one aspect of the present invention includes a lens containing resin, and a lens holder configured to hold the lens via an adhesive. The lens includes a first area, and a second area, the adhesive being applied to the second area, and the second area being adhered to the lens holder and containing more oxides or modified (or denatured) materials of the resin than the first area.

Further features of the present invention will become apparent from the following description of exemplary embodiments with reference to the attached drawings.

BRIEF DESCRIPTION OF THE DRAWINGS

FIG. 10 is a comparative table 1 illustrating effects according to the first embodiment.
FIG. 11 is a comparative table 2 illustrating effects according to the first embodiment.
FIG. 12 is a comparative table 3 illustrating effects according to the first embodiment.

DESCRIPTION OF THE EMBODIMENTS

Referring now to the accompanying drawings, a detailed description will be given of embodiments according to the present invention.

First Embodiment

Figure 1:
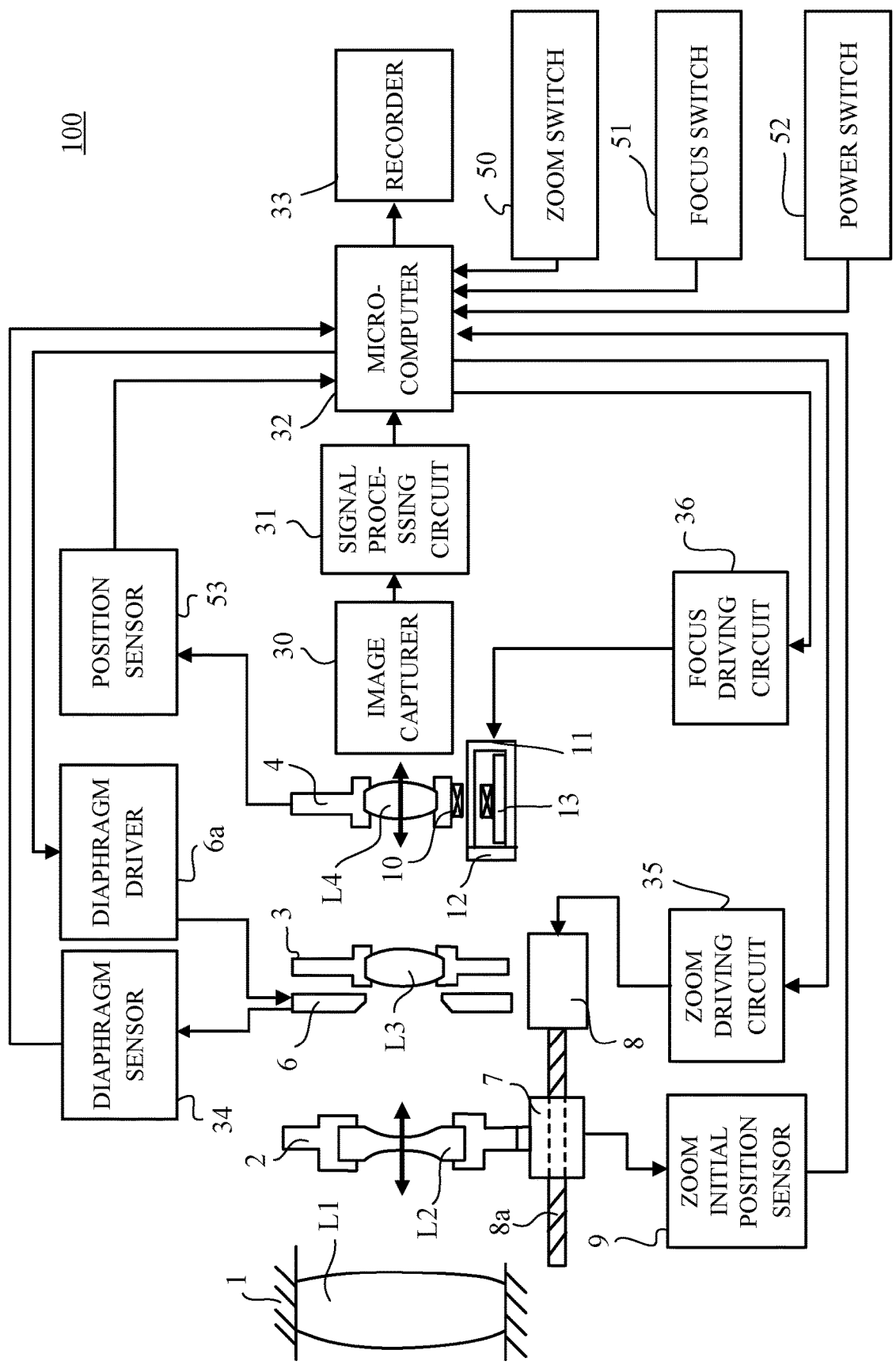
FIG. 1 is a block diagram of an imaging apparatus according to a first embodiment.

Referring now to FIG. 1, a description will be given of an imaging apparatus (optical apparatus) according to a first embodiment of the present invention. FIG. 1 is a block diagram of the imaging apparatus 100 according to this embodiment. The imaging apparatus 100 is, but not limited to, a digital video camera, a digital still camera, a surveillance camera, and a lens interchangeable type camera. This embodiment describes, but is not limited to, the imaging apparatus 100 as the optical apparatus, and is applicable to another optical apparatus, such as a binocular, a telescope, or a field scope. This is applied to other embodiments.

In FIG. 1, reference numeral L1 denotes a first lens unit having a positive refractive power that is fixed in zooming. Reference numeral L2 denotes a second lens unit having a negative refractive power as a magnification varying lens unit (zoom lens unit) which varies a magnification by moving in the optical axis direction illustrated by an arrow in FIG. 1. Reference numeral L3 denotes a third fixed lens unit having a positive reflective power. Reference numeral L4 denotes a fourth lens unit having a positive refractive power as a focus lens unit that provides focusing by moving in the optical axis direction illustrated in the arrow direction in FIG. 1. The first lens unit L1, the second lens unit L2, the third lens unit L3, and the fourth lens unit L4 constitute an imaging optical system (lens barrel).

Reference numeral 1 denotes a front barrel that holds the first lens unit L1. Reference numeral 2 denotes is a zoom lens holding frame (first moving member) that holds the second lens unit L2 and is supported movably along two guide bars (not illustrated) in the optical axis direction. Reference numeral 3 denotes a fixing member configured to hold the third lens unit L3. Reference numeral 4 is a focus lens holding frame (second moving member) that holds the fourth lens unit L4, movably supported in the optical axis direction along the two guide bars (not illustrated). An approximately rectangular column air-core coil 10 and a flexible printed substrate (not illustrated) configured to electrify the coil 10 are fixed onto the focus lens holding frame 4.

Reference numeral 8 denotes a zoom motor as a driver (actuator) that drives the second lens unit L2. A leadscrew 8a as a feed screw is engaged with a rack member 7 provided to the zoom lens holding frame 2 that is guided movably in the optical axis direction. As the rotor rotates, the first moving member 2 moves in the optical axis direction. The leadscrew 8a is disposed parallel to the optical axis and coaxial with the rotor in the zoom motor 8.

Reference numeral 9 denotes a zoom initial position sensor that includes a photo-interrupter. The zoom initial position sensor 9 electrically detects switching of a light shield and a light transmission as an unillustrated light shield provided to the zoom lens holding frame 2 moves in the optical axis direction, and detects an origin (reference position) in the optical axis direction of the zoom lens holding frame 2.

Reference numeral 6 denotes a guillotine type diaphragm unit (aperture stop unit) that changes an aperture diameter in the optical system by using a diaphragm driver 6a as a driver to move two diaphragm blades in opposite directions. Reference numeral 34 denotes a diaphragm sensor that detects a rotating position of a driving magnet of the diaphragm unit 6 through a Hall element.

An image capturer 30 includes an image sensor, such as a CCD sensor and a CMOS sensor, a low-pass filter, an infrared cut filter, and the like, and is fixed in a rear barrel (not illustrated). The image capturer 30 photoelectrically converts an optical image formed by the imaging optical system (lens barrel), generates an image signal (image data), and outputs the image signal to a signal processing circuit 31. Yokes 11 and 12 and a magnet 13 are fixed onto the rear barrel. The yoke 11 has a U-shaped section, extends in the optical axis direction, and holds the magnet 13. Air-core part of the coil 10 is inserted into the yoke 11, and the coil 10 is separated from the yoke 11 and the magnet 13. The magnet 13 is magnetized in a direction orthogonal to the optical axis, and extends in the optical axis direction. The yoke 12 is held at the end on the open side of the yoke 11. The coil 10, the yokes 11 and 12, and the magnet 13 constitute a voice coil motor (VCM or linear actuator). The voice coil motor enables the focus lens holding frame 4 to move in the predetermined direction (optical axis direction).

The signal processing circuit 31 performs signal processing for an output from the image capturer 30, such as a predetermined amplification and a gamma correction. A signal processed by the signal processing circuit 31 is output to a microcomputer 32. The microcomputer 32 receives many signals and performs signal processing for them. The microcomputer 32 outputs many signals in accordance with the input signals and controls optical apparatuses etc. For example, the microcomputer 32 sends the diaphragm driving signal output to the diaphragm driver to adjust a light quantity in accordance with the input signal from the signal processing circuit 31 and the input signal from the diaphragm sensor 34, such as a rotating amount for the diaphragm driver. Reference numeral 33 denotes a recorder (storage) for recording an image signal processed by the microcomputer 32 and another recording condition.

Reference numeral 50 denotes a zoom switch configured to instruct a magnification varying operation. Reference numeral 51 denotes a focus switch that enables a photographer to intentionally instruct a manual focusing operation (in-focus operation). Reference numeral 52 denotes a power switch. When the power switch 52 is turns on, the zoom motor 8 receives a driving signal from a zoom driving circuit 35 in accordance with the signal from the microcomputer 32. The zoom initial position sensor 9 detects the initial position, and the zoom lens holding frame 2 moves to a predetermined position and stands by. A position of the zoom motor 8 is controlled in accordance with the operation of the zoom switch 50 at the step number from the initial position. When the zoom switch 50 is operated, the microcomputer 32 determines which moving direction the operation is made for zooming. When the focus driving circuit 36 electrifies the coil 10, the focus lens holding frame 4 is driven in the optical axis direction by the operation of the magnetic circuit that includes the yokes 11 and 12 and the magnet 13.

Figure 2:
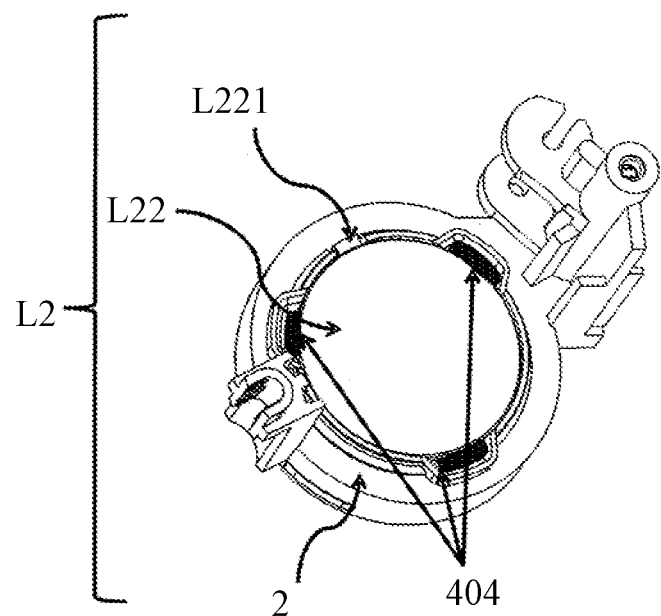
FIG. 2 is a perspective view of a zoom lens unit according to the first embodiment.
Figure 3:
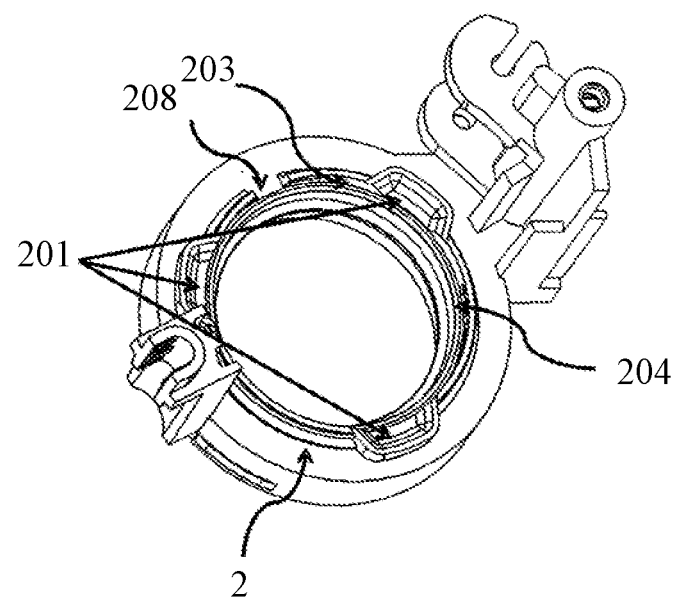
FIG. 3 is a perspective view of a lens holder according to this embodiment.
Figure 4:
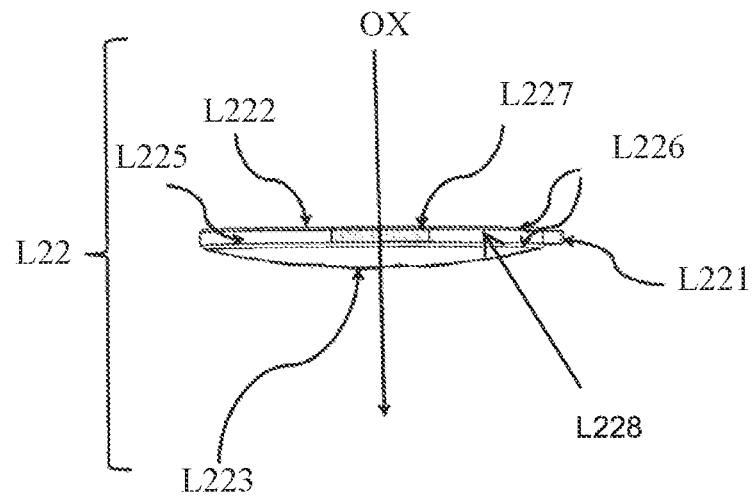
FIG. 4 is a side view of a zoom lens according to the first embodiment.

Referring now to FIGS. 2 to 4, a description will be given of the structure of the second lens unit L2. FIG. 2 is a perspective view of the second lens unit L2 (zoom lens unit). The second lens unit L2 includes a zoom lens holding frame 2 (lens holder) and a zoom lens L22 (optical element) that is mainly made of or contains resin. The zoom lens L22 is a lens (optical element) mainly made of resin, such as cycloolefin polymer (COP), and has a convex shape L221 as a positioning portion. The zoom lens L22 is integrally fixed (adhered) to the zoom lens holding frame 2 via an adhesive 404. The lens mainly made of rein is a lens that contains resin by 90% by weight or more.

FIG. 3 is a perspective view of the zoom lens holding frame 2 in the second lens unit L2. As illustrated in FIGS. 2 and 3, the zoom lens holding frame 2 includes an internal circumference frame 203 larger than the outer shape of the zoom lens L22 and almost the same shape, and a body support 204 configured to support the zoom lens L22. The zoom lens holding frame 2 has three adhesive grooves 201 made as adhesive holders (adhesive parts) for holding the adhesive 404 at notches formed at parts of the internal circumference frame 203. Similar to the adhesive grooves 201, a concave part 208 is provided as a receiver for receiving the positing member (convex part L221) in the zoom lens L22 at a notch formed at part of the internal circumference frame 203.

FIG. 4 is a side view of the zoom lens L22. In FIG. 4, OX is an optical axis direction of the zoom lens L22. An optical antireflection film is coated on each of an optical surface L222 and an optical surface L223 opposite to the optical surface L222 on the zoom lens L22 so as to restrain unintentional reflections in the imaging apparatus 100. The optical antireflection film includes a multilayer film mainly made of magnesium fluoride, silicon dioxide, and alumina, and magnesium fluoride exposes on the uppermost surface. On the other hand, no optical antireflection film is coated on an outer circumference part L225 of the zoom lens L22, and cycloolefin polymer (COP) exposes as a base material of the zoom lens L22. This is because it is less necessary to provide the optical antireflection film to the outer circumference part L225 on the zoom lens L22, and it is necessary to hold the side surface so as to support the zoom lens L22 in coating the zoom lens L22 with the optical antireflection film. Since a film is formed on both optical surfaces L222 and L223 and the outer circumference part L225 (side part), an edge part L226 is prevented to have an unstable film thickness and peeling off.

This embodiment hydrophilizes part of the outer circumference part L225 in the zoom lens L22 to obtain modified cycloolefin polymer L227 (second area) that is more hydrophilic than that of an unhydrophilized area L228 (first area) in the outer circumference part L225. In other words, the zoom lens L22 includes the first area and the second area that is more hydrophilic than the first area, and the zoom lens L22 is fixed onto the zoom lens holding frame 2 via the adhesive (agent) 404 in the second area.

The second area that is more hydrophilic than the first area contains a resin oxide or a decomposed modified material (denaturant) more than the first area. In this embodiment, the resin oxide or decomposed denaturant, as used herein, corresponds to modified cycloolefin polymer L227.

The second area in the zoom lens L22 may be an area (in which an effective light flux does not pass) different from an optical surface that contains the optical axis in the zoom lens L22. The area different from the optical surface of the zoom lens L22 includes the first area and the second area that contacts the first area. The second area in the zoom lens L22 includes at least part (all or part) of the side surface of the zoom lens L22. The zoom lens L22 may be a spherical lens or an aspherical lens.

Figure 5:
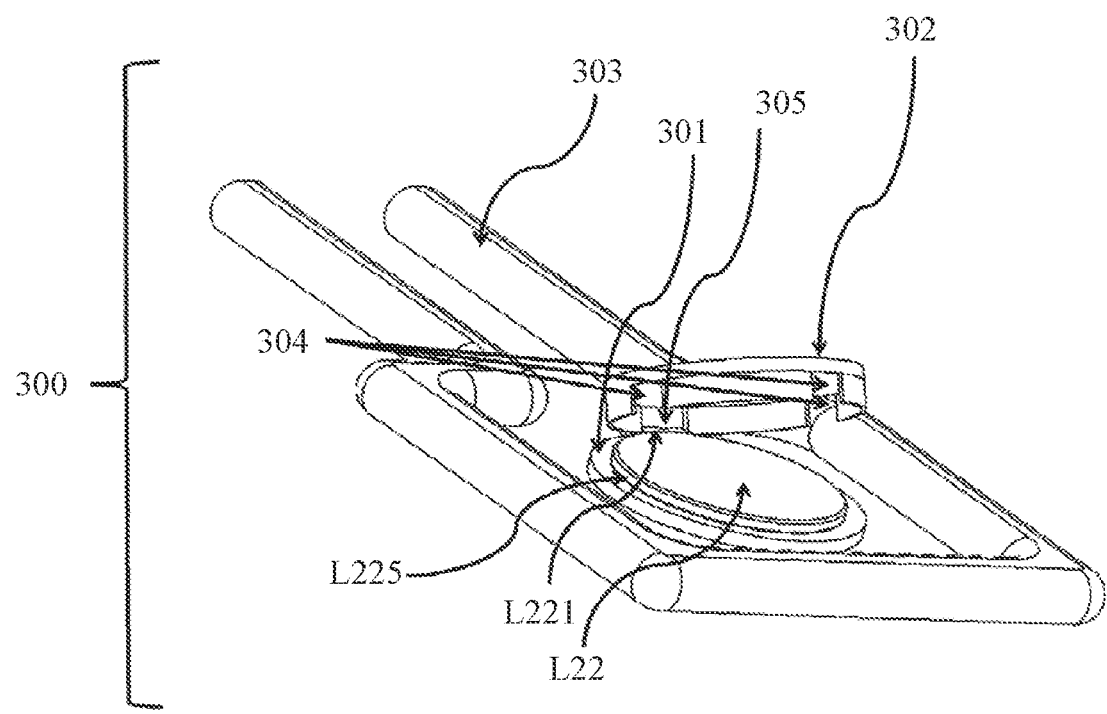
FIG. 5 is a perspective view of a hydrophilization (or hydrophilic treatment) apparatus according to the first embodiment.

Referring now to FIGS. 5 to 8, a description will be given of the hydrophilizaion for the zoom lens L22. FIG. 5 is a perspective view of the hydrophilization apparatus 300 (hydrophilizing tool) according to this embodiment. The hydrophilization apparatus 300 provides a hydrophilization such that positions (second area) facing the adhesive grooves 201 (adhesive part) in the zoom lens holding frame 2 in the zoom lens L22 is more hydrophilic than another part (first area) in the zoom lens L22. As illustrated in FIG. 5, the hydrophilization apparatus 300 exposes and hydrophilizes part of the outer circumference part L225 in the zoom lens L22.

The hydrophilization apparatus 300 includes a receiver 301, a lid 302 (cover), and a low-pressure mercury lamp 303. The zoom lens L22 can be set to the hydrophilization apparatus 300 by opening the lid 302 and by placing the zoom lens L22 on the receiver 301. The lid 302 has a concave part 305 (positioning part) for receiving the convex part L221 in the zoom lens L22. The lid 302 has a window 304 that exposes the part of the outer circumference part L225 in the zoom lens L22. The part of the outer circumference part L225 in the zoom lens L22 can be exposed to the low-pressure mercury lamp 303 by closing the lid 302 while the concave part 305 in the hydrophilization apparatus 300 is engaged with the convex part L221 in the zoom lens L22.

Figure 6:
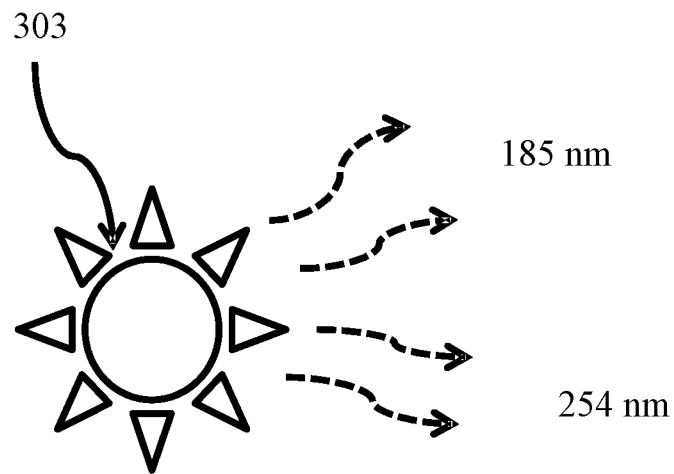
FIG. 6 is a hydrophilization mechanism according to the first embodiment.

FIG. 6 illustrates a hydrophilization mechanism using the low-pressure mercury lamp 303. The hydrophilization is performed with the low-pressure mercury lamp 303 in the hydrophilization apparatus 300. When the low-pressure mercury lamp 303 turns on, it emits UV of at least 185 nm and 254 nm. The UV with 185 nm emitted from the low-pressure mercury lamp 303 decomposes part of oxygen in the hydrophilization apparatus 300, and generates oxygen atoms (chemical formula (1) in FIG. 6). The generated oxygen atoms react with another oxygen molecule and generate ozone (chemical formula (2) in FIG. 6). The UV with 254 nm irradiated from the low-pressure mercury lamp 303 decomposes the generated ozone into an oxygen atom having a stronger oxidation property and an excited oxygen molecule (chemical formula (3)). This reaction process activates water in the hydrophilization apparatus etc., and generates hydroxy radicals etc. These materials activated by the low-pressure mercury lamp 303 is referred to as reactive oxygen species. The reactive oxygen species have a strong oxidation power and oxidize any contact things, while the reactive oxygen species chemically react into stable materials. In the general environment, the reactive oxygen species have very short lives and an oxidation process is highly effective to a surface on which the UV having two types of wavelengths is irradiated. Since an organic material, such as cycloolefin polymer as the main ingredient of the zoom lens L22, is oxidized and decomposed, the unstable surface may modify cycloolefin polymer, providing the polarity and augmenting a hydrophilic property. In this embodiment, the hydrophilization contains, for example, an ozone process, a corona discharge process, a radical process utilizing a corona discharge, a plasma process, and a UV light irradiation process, but the present invention is no limited to this embodiment. The hydrophilization may be performed by two or more of these processes.

Figure 7:
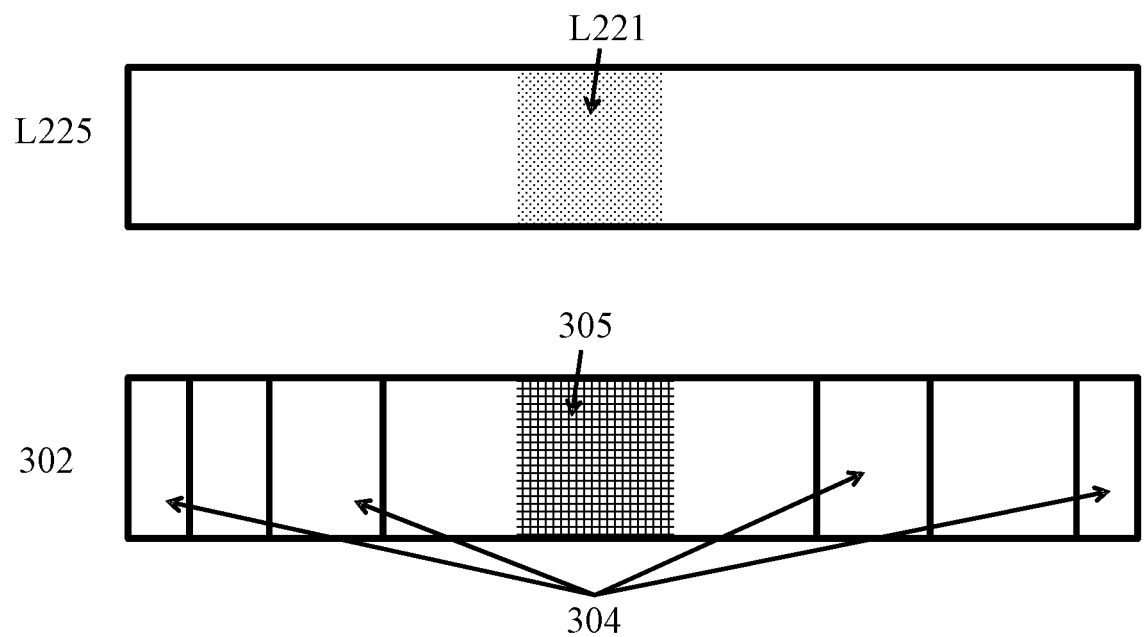
FIG. 7 is a side view of the zoom lens and a lid of the hydrophilization apparatus according to the first embodiment.

FIG. 7 is a side view of the zoom lens L22 and the lid 302 of the hydrophilization apparatus 300, illustrating a developed diagram of a phase relationship between the outer circumference part L225 (convex part L221) in the zoom lens L22 and the concave part 305 and the window 304 in the lid 302 in the hydrophilization apparatus 300. As illustrated in FIG. 7, the partial hydrophilization can be performed with a desired phase (angular position) by closing the lid 302 while the concave part 305 in the hydrophilization apparatus 300 is engaged with the convex part L221 (positioning portion) in the zoom lens L22. Thus, this embodiment hydrophilizes the partial area (second area) in the zoom lens L22 that exposes to the lid 302, while the predetermined area (first area) in the zoom lens L22 is covered with the lid 302.

Figure 8:
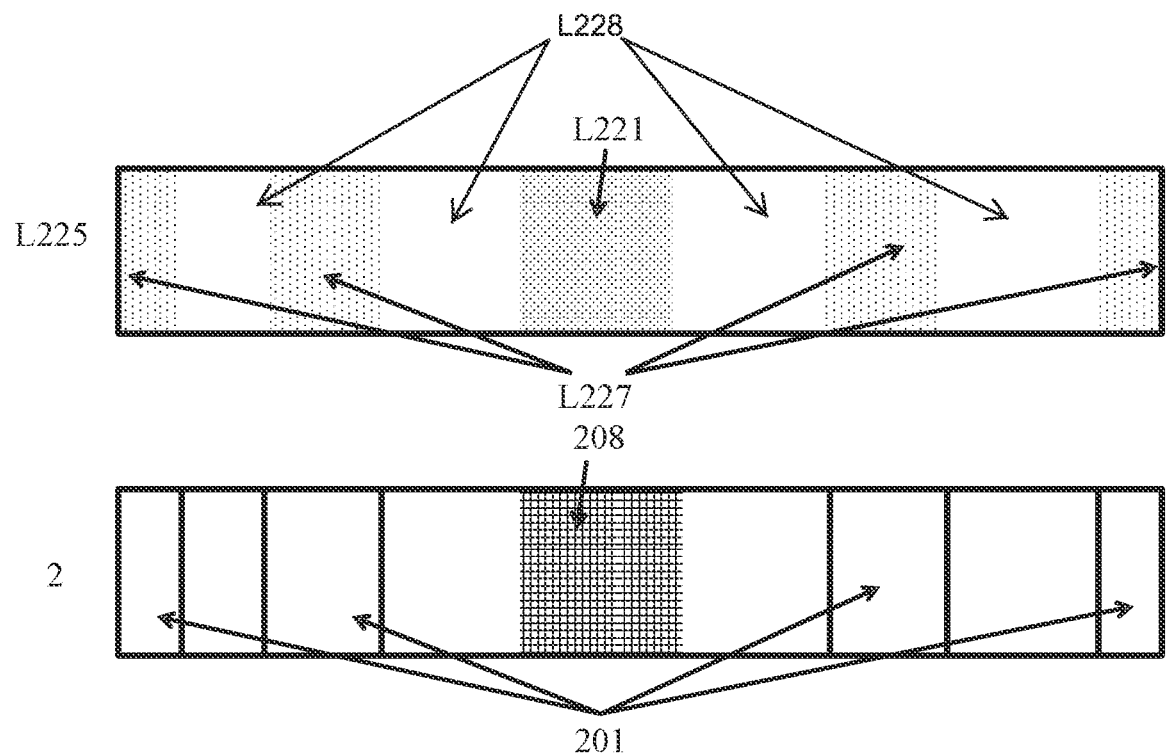
FIG. 8 is a side view of the hydrophilized zoom lens and the lens holder according to the first embodiment.

FIG. 8 is a side view of the hydrophilized zoom lens L22 and the zoom lens holding frame 2, illustrating a developed diagram of the outer circumference part L225 in the zoom lens L22 and the lens holding frame 2. As illustrated in FIG. 8, the convex part L221 in the zoom lens L22 is engaged with the concave part 208 in the zoom holding frame 2. Thereby, the modified cycloolefin polymer L227 that is hydrophilic to the outer circumference L225 in the zoom lens L22 can be aligned in phase with the adhesive groove 201 in the zoom lens holding frame 2.

Figure 9:
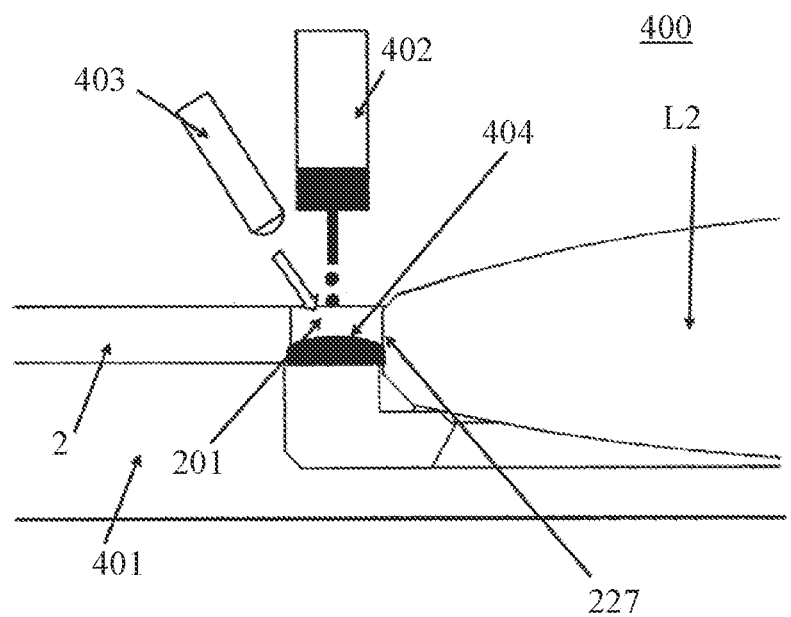
FIG. 9 is an explanatory view of an adhering tool according to the first embodiment.

Referring now to FIG. 9, a description will be given of an adhering tool 400 used to adhere the hydrophilized zoom lens L22 to the zoom lens holding frame 2. FIG. 9 is an explanatory view of the adhering tool 400 configured to adhere the hydrophilized zoom lens L22 to the zoom lens holding frame 2 by using the adhesive 404, such as UV curable adhesive. The adhering tool 400 includes a receiver 401 that receives the zoom lens holding frame 2, and a syringe 402 that drops the adhesive 404, and an UV irradiating unit 403. While the zoom lens holding frame 2 is attached to the receiver 401 in the adhering tool 400, the syringe 402 drops the adhesive 404 down to the adhesive groove 201 in the zoom lens L22. The UV irradiating unit 403 irradiates the UV onto the adhesive 404 dropped from the syringe 402 so as to cure the adhesive 404. Thereby, the zoom lens L22 is adhered onto the zoom lens holding frame 2.

Referring now to FIGS. 10 to 13, a description will be given of effects of this embodiment. FIG. 10 illustrates a comparative table 1 illustrating the effects according to this embodiment, or adhesive holding powers (or pulling powers) strengths between the hydrophilized zoom lens L22 ("hydrophilized") adhered to the zoom lens holding frame 2 receiving a thermal impact and the unhydrophilized zoom lens L22 ("unhydrophilized") adhered to the zoom lens holding frame 2 and receiving the thermal impact. It is understood as illustrated in FIG. 10 that an adhesive holding power of 5 kg or higher remains in the hydrophilized zoom lens L22 whereas an adhesive holding power is almost lost such as 0.1 kg in the unhydrophilized zoom lens L22.

FIG. 11 illustrates a comparative table 2 illustrating the effects according to this embodiment in the similar situation by changing a type of the adhesive 404. It is found that similar effects are obtained in FIG. 11. The adhesive 404 in this embodiment may use, but is not limited to, a UV curable adhesive, such as ThreeBond TB3055 and TB3114, Kyoritsu Chemical 8120T3, etc. In addition, the adhesive 404 is not limited to the UV curable adhesive, and may use another type of adhesive, such as moisture curable adhesive (single component room temperature curable adhesive) for the effects according to this embodiment.

FIG. 12 illustrates a comparative table 3 illustrating the effects according to this embodiment, or a transmission characteristic (transmittance) of the zoom lens L22 for each wavelength. In FIG. 12, the pre-treatment transmittance is a transmittance for the unhydrophilized zoom lens L22a. The partially hydrophilized transmittance is a transmittance for the zoom lens L22 according to this embodiment in which only part of the outer circumference part L225 has been hydrophilized. The entirely hydrophilized transmittance is a transmittance for the zoom lens L22b in which the entire outer circumference part L225 has been hydrophilized.

As illustrated in FIG. 12, the transmittance for each wavelength of the zoom lens L22b in which the entire outer circumference part L225 has been hydrophilized through the low-pressure mercury lamp 303 changes from the transmittance of the pre-hydrophilization zoom lens L22a. On the other hand, the zoom lens L22 according to this embodiment in which only part of the outer circumference part L225 has been hydrophilized has the transmittance almost equivalent with that of the pre-hydrophilization zoom lens L22. Hence, the hydrophilization according to this embodiment can maintain the optical characteristic and obtain the adhesive power.

Figures 13, 14:
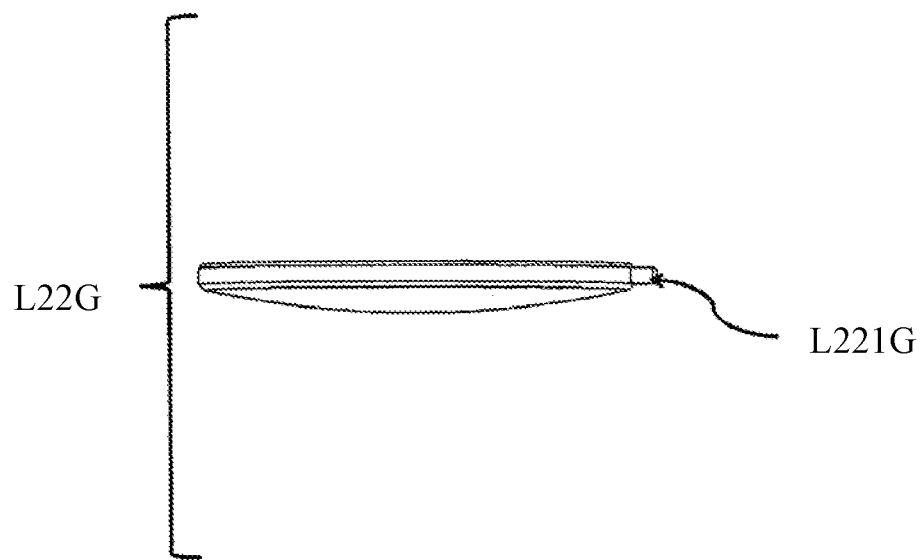
FIG. 13 is a comparative table 4 illustrating effects according to the first embodiment.
FIG. 14 is a side view of a zoom lens according to a second embodiment.

FIG. 13 is a comparative table 4 illustrating the effects according to this embodiment. In FIG. 13, a partially hydrophilized product indicates a water absorbing amount for the zoom lens L22 according to this embodiment in which only part of the outer circumference part L225 has been hydrophilized, and an entirely hydrophilized product indicates a water absorbing amount for the zoom lens L22b in which the entire outer circumference part L225 has been hydrophilized. As illustrated in FIG. 13, when the zoom lens L22 and the zoom lens L22b are compared with each other, the water absorbing amount for the zoom lens L22 is maintained as low as 0.02 where the water absorbing amount of the zoom lens L22b is set to 1 and the zoom lens L22 is unlikely to cause a resin deterioration due to the hydrolysis etc. As a result, the hydrophilization improves the reliability of the optical element (lens).

Second Embodiment

Figure 15:
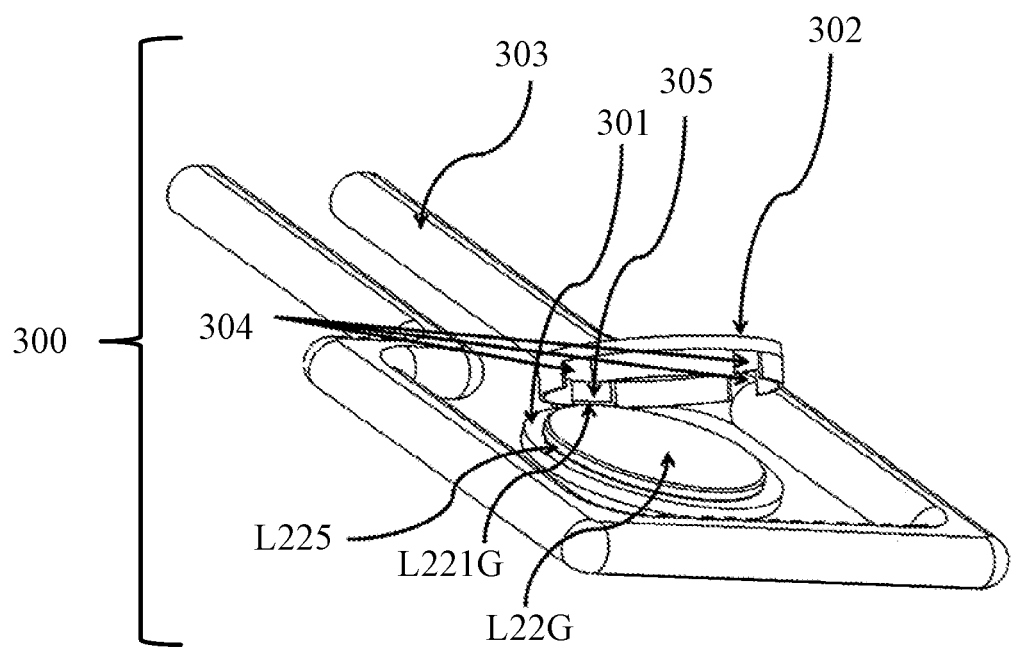
FIG. 15 is a perspective view of a hydrophilization apparatus according to the second embodiment.
Figure 16:
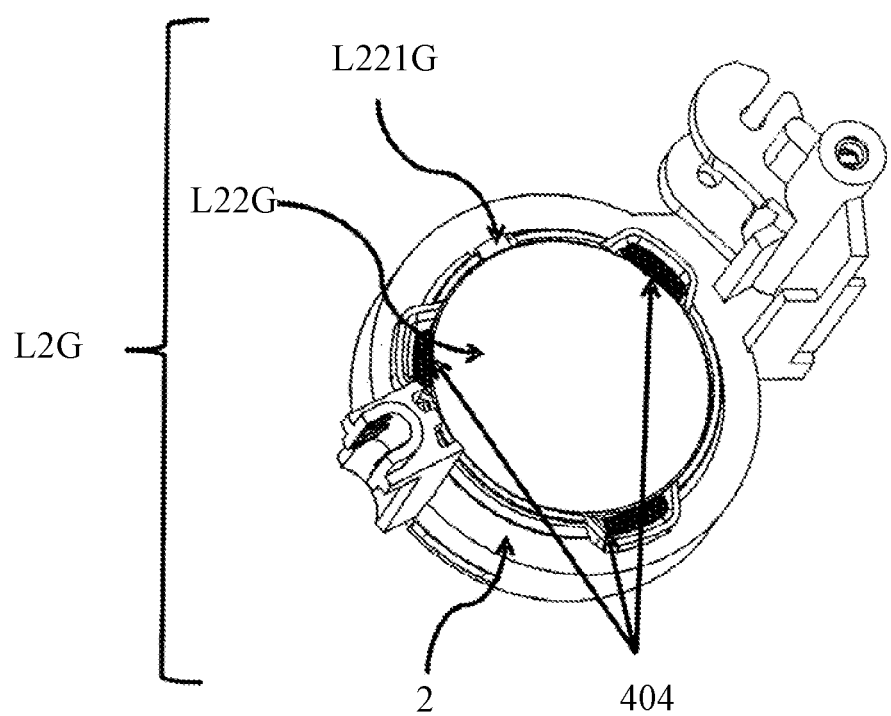
FIG. 16 is a perspective view of a zoom lens unit according to the second embodiment.

Referring now to FIGS. 14 to 16, a description will be given of a second embodiment according to the present invention. FIG. 14 is a side view of a pre-hydrophilization zoom lens L22G. The zoom lens L22G is an optical element (lens) mainly made of thermoplastic resin through injection molding. The zoom lens L22G has a convex part L221G has a gate residue shape in the injection molding. The convex part L221G serves as a positioning portion configured to position the zoom lens L22 to the zoom lens holding frame 2. In other words, the positioning portion in the zoom lens L22G corresponds to the gate member for the injection molding. This embodiment may provide a concave part instead of the convex part L221G as the positioning portion.

FIG. 15 is a perspective view of the hydrophilization apparatus 300 when the convex part L221G having a gate residue shape in the zoom lens L22G is used for the positioning portion. FIG. 16 is a perspective view of a second lens unit L2G (zoom lens unit) according to this embodiment in which the zoom lens L22G is adhered to the zoom lens holding frame 2. As illustrated in FIGS. 15 and 16, this embodiment can reduce the cost and the number of steps by using the convex part L221G having the gate residue shape for the positioning portion in comparison with the structure of the first embodiment that uses a new positioning portion.

Third Embodiment

Figure 17:
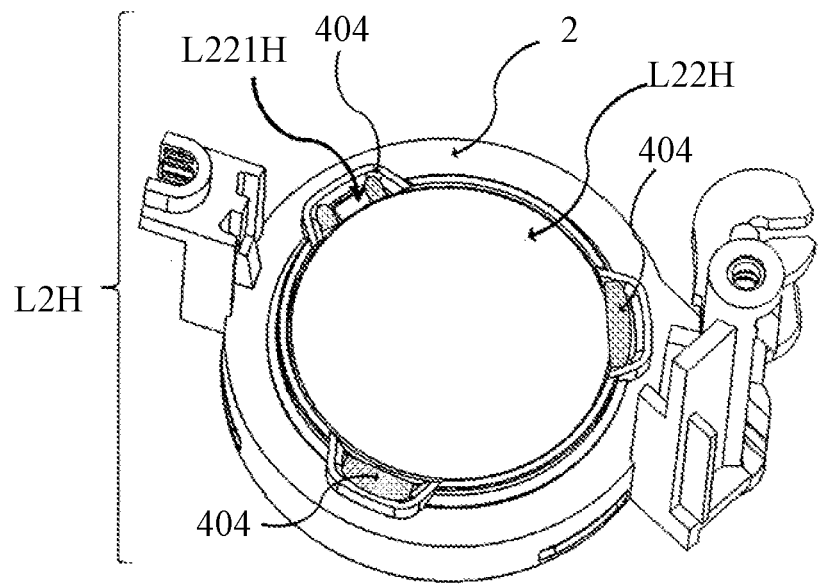
FIG. 17 is a perspective view of a zoom lens unit according to a third embodiment.
Figure 18:
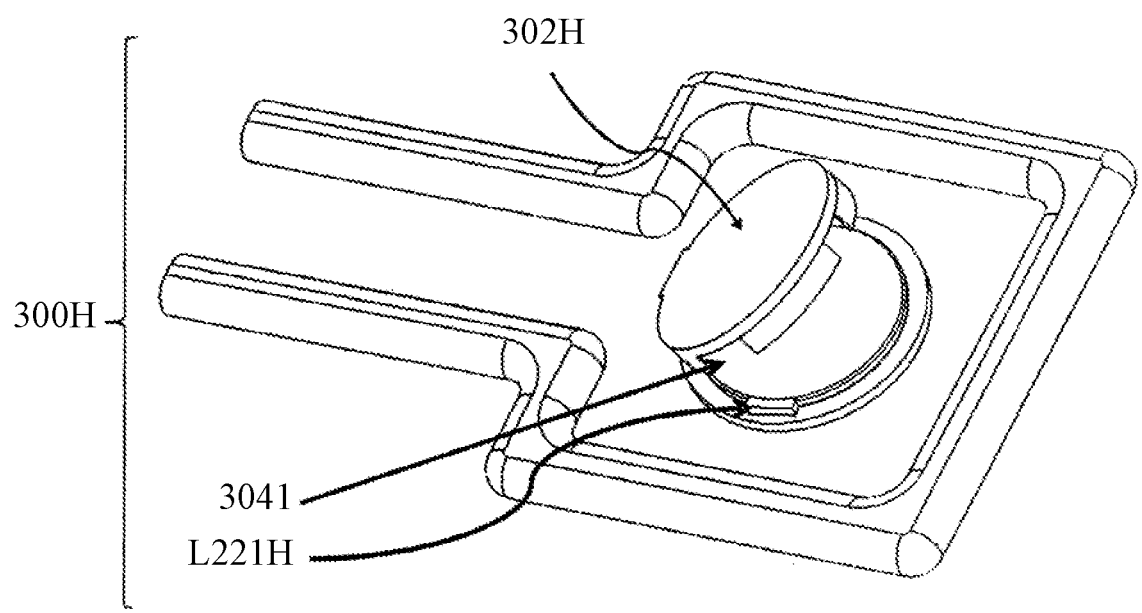
FIG. 18 is a perspective view of a hydrophilization apparatus according to the third embodiment.

Referring now to FIGS. 17 and 18, a description will be given of a third embodiment according to the present invention. FIG. 17 is a perspective view of a second lens unit L2H (zoom lens unit) according to this embodiment, in which a hydrophilized zoom lens L22H is adhered onto the zoom lens holding frame 2 via the adhesive 404.

Similar to the first and second embodiments, the outer circumference part in the zoom lens L22H has a convex part L221H as the positioning portion. This embodiment hydrophilizes the convex part L221H as the positioning portion, which is integrated with the zoom lens holding frame 2 via the adhesive 404.

FIG. 18 is a perspective view of the hydrophilization apparatus 300H according to this embodiment. As illustrated in FIG. 18, the hydrophilization apparatus 300H provides positioning through the convex part L221H, and the convex part L221H opens through a window 3041 in a lid 302H of the hydrophilization apparatus 300H for the hydrophilization. As illustrated in FIGS. 17 and 18, this embodiment can effectively utilize the outer circumference part of the zoom lens L22H and increase the adhesion area by using as the adhering part the convex part L221H for positioning which is provided on the outer circumference part in the zoom lens L22H.

Thus, the lens barrel of each embodiment is manufactured by the hydrophilizing step, the positioning step, and the fixing step in this order. The hydrophilizing step hydrophilizes the partial area (second area) of the zoom lens L22 mainly made of resin. The positioning step positions the zoom lens L22 and the zoom lens holding frame 2 for holding the zoom lens L22, relative to each other. The fixing step fixes the zoom lens L22 onto the zoom lens holding frame 2 via the adhesive 404.

Each embodiment can provide a lens barrel that improves the optical reliability of the plastic lens, and an imaging apparatus having the same.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment hydrophilizes a zoom lens but the present invention is not limited to this embodiment and may hydrophilizes another optical element (lens). Each embodiment provides the convex part as the positioning portion for the zoom lens, and the concave part as the positioning portion for the zoom lens holding frame, but the present invention is not limited to this embodiment. A concave part may be provided as the positioning portion for the zoom lens L22, and a convex part may be provided as the positioning portion for the zoom lens holding frame 2.

This application claims the benefit of Japanese Patent Application No. 2017-080958, filed on Apr. 14, 2017, which is hereby incorporated by reference herein in its entirety.

What is claimed is:

1. A lens barrel comprising:
a lens containing resin; and
a lens holder configured to hold the lens via an adhesive,
wherein an outer circumference part of the lens includes a first area and a second area, a surface of the lens other than the outer circumference part being coated with an antireflection film, the second area being more hydrophilic than the first area, the adhesive being applied to the second area and not to the first area, and the second area being adhered to the lens holder via the adhesive.

2. The lens barrel according to claim 1, wherein the more hydrophilic second area is obtained by at least one of an ozone process, a corona discharge process, a radical process utilizing a corona discharge, a plasma process, and a UV light irradiation process for the resin contained in the lens.

3. The lens barrel according to claim 1, wherein the lens includes a positioning portion,
wherein the lens holder includes a receiver configured to receive the positioning portion, and an adhering part configured to contact the adhesive, and
wherein the second area in the lens has a position that faces the adhering part in the lens holder.

4. The lens barrel according to claim 3, wherein the second area in the lens includes at least part of the positioning portion, and
wherein the positioning portion in the lens is fixed onto the receiver in the lens holder via the adhesive.

5. The lens barrel according to claim 3, wherein the resin in the lens is thermoplastic resin, and the positioning portion in the lens corresponding to a gate member used for injection molding.

6. The lens barrel according to claim 1, wherein the second area in the lens is an area different from an optical surface that contains an optical axis in the lens.

7. The lens barrel according to claim 6, wherein the optical surface that contains an optical axis in the lens includes the first area and the second area that contacts the first area.

8. The lens barrel according to claim 1, wherein the second area in the lens includes at least part of a side surface of the lens.

9. The lens barrel according to claim 1, wherein the lens is made of the resin by 90% by weight or more.

10. The lens barrel according to claim 1, wherein the lens is an aspheric lens.

11. An imaging apparatus comprising:
a lens barrel according to claim 1; and
an image sensor configured to photoelectrically convert an optical image formed by the lens barrel.

12. A manufacturing method of a lens barrel comprising:
oxidizing a partial area on a lens containing resin to obtain an outer circumference part of the lens including a first area and a second area, a surface of the lens other than the outer circumference part being coated with an antireflection film, the second area corresponding to the partial area and being more hydrophilic than the first area;
positioning the lens and a lens holder configured to hold the lens, relative to each other; and
fixing the lens onto the lens holder via an adhesive applied to the second area and not to the first area.

13. The manufacturing method of the lens barrel according to claim 12, wherein the oxidizing oxidizes the partial area which is exposed from a cover with a predetermined area on the lens covered by the cover.

14. The manufacturing method of the lens barrel according to claim 12, wherein the oxidizing includes one of an ozone process, a corona discharge process, a radical process utilizing a corona discharge, a plasma process, and a UV light irradiation process for the partial area.

* * * * *